United States Patent [19]
Fletcher et al.

[11] Patent Number: 5,547,776
[45] Date of Patent: Aug. 20, 1996

[54] ELECTROCHEMICAL FUEL CELL STACK WITH CONCURRENTLY FLOWING COOLANT AND OXIDANT STREAMS

[75] Inventors: Nicholas J. Fletcher; Clarence Y. Chow; Eric G. Pow, all of Vancouver; Boguslav M. Wozniczka, Coquitlam; Henry H. Voss, West Vancouver, all of Canada; Gerald Hornburg, Elchingen, Germany

[73] Assignees: Ballard Power Systems Inc., North Vancouver, Canada; Daimler-Benz AG, Stuttgart, Germany

[21] Appl. No.: 265,414

[22] Filed: Jun. 24, 1994

Related U.S. Application Data

[63] Continuation-in-part of Ser. No. 138,714, Oct. 19, 1993, Pat. No. 5,441,819, which is a continuation of Ser. No. 641,601, Jan. 15, 1991, Pat. No. 5,260,143.

[51] Int. Cl.$^6$ .................................................. H01M 8/04
[52] U.S. Cl. ................................................ 429/13; 429/26
[58] Field of Search ....................... 429/13, 26; 204/274, 204/280

[56] References Cited

U.S. PATENT DOCUMENTS

| | | | |
|---|---|---|---|
| 3,761,316 | 9/1973 | Stedman | 429/26 |
| 4,129,685 | 12/1978 | Damiano | 429/44 X |
| 4,324,844 | 4/1982 | Kothmann | 429/26 |
| 4,729,932 | 3/1988 | McElroy | 429/34 |
| 4,795,683 | 1/1989 | McElroy | 429/13 |
| 4,826,742 | 5/1989 | Reiser | 429/33 |
| 4,973,530 | 11/1990 | Vanderborgh et al. | 429/13 |
| 4,988,583 | 1/1991 | Watkins et al. | 429/30 |
| 5,108,849 | 4/1992 | Watkins et al. | 429/30 |
| 5,230,966 | 7/1993 | Voss et al. | 429/26 |
| 5,260,143 | 11/1993 | Voss et al. | 429/13 |
| 5,262,249 | 11/1993 | Beal et al. | 429/26 |
| 5,382,478 | 1/1995 | Chow et al. | 429/26 |

*Primary Examiner*—Stephen Kalafut
*Attorney, Agent, or Firm*—McAndrews, Held & Malloy, Ltd.

[57] ABSTRACT

A fuel cell assembly within an electrochemical fuel cell stack has a cooling jacket disposed adjacent the cathode layer. The cooling layer comprises a coolant stream inlet, a coolant stream outlet, and at least one channel for directing a coolant stream from the coolant stream inlet to the coolant stream outlet. The coolant stream channels extend such that the coolest region of the cooling layer substantially coincides with the region of the adjacent cathode layer having the highest concentration of oxygen (and also the lowest water content), and the warmest region of the cooling layer substantially coincides with the region of the adjacent cathode layer having the lowest concentration of oxygen (and also the highest water content).

38 Claims, 7 Drawing Sheets

ELECTROCHEMICAL FUEL CELL STACK WITH CONCURRENTLY FLOWING COOLANT AND OXIDANT STREAMS

CROSS-REFERENCE TO RELATED APPLICATIONS

This application is a continuation-in-part of U.S. patent application Ser. No. 08/138,714 filed Oct. 19, 1993, now U.S. Pat. No. 5,441,819 entitled "Method And Apparatus For Removing Water From Electrochemical Fuel Cells By Controlling The Temperature And Pressure Of The Reactant Streams." The '714 application is, in turn, a continuation of U.S. patent application Ser. No. 07/641,601 filed Jan. 15, 1991, now U.S. Pat. No. 5,260,143, entitled "Method And Apparatus For Removing Water From Electrochemical Fuel Cells." The '143 patent and '714 application, which are incorporated herein by reference in their entirety, describe the absorption into a reactant stream of reaction product water, formed at the cathode of a fuel cell as a liquid, by controlling the temperature of the stream into which the reaction product water is to be absorbed.

FIELD OF THE INVENTION

The present invention relates to electrochemical fuel cells. More particularly, the present invention relates to an electrochemical fuel cell stack in which the coolest region of each cooling layer substantially coincides with the region of the adjacent cathode layer in which the oxidant gas stream has the lowest water content, and the warmest region of each cooling layer substantially coincides with the region of the adjacent cathode layer in which the oxidant stream has the highest water content.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product. The anode and cathode reactions in hydrogen/oxygen fuel cells are shown in the following equations:

Anode reaction:

$$H_2 \rightarrow 2H^+ + 2e^-$$

Cathode reaction:

$$\tfrac{1}{2}O_2 + 2H^+ + 2e^- \rightarrow H_2O$$

In typical fuel cells, the MEA is disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is usually held together by tie rods and end plates. The stack typically includes manifolds and inlet ports for directing the fuel (substantially pure hydrogen, methanol reformate or natural gas reformate) and the oxidant (substantially pure oxygen or oxygen-containing air) to the anode and cathode flow field channels. The stack also usually includes a manifold and inlet port for directing the coolant fluid, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for the coolant water exiting the stack. It is generally convenient to locate all of the inlet and outlet ports at the same end of the stack.

Hydrogen ion conductivity through ion exchange membranes generally requires the presence of water molecules between the surfaces of the membrane. The fuel and oxidant gases are therefore humidified prior to introducing them to the fuel cell to maintain the saturation of the membranes within the MEAs. Ordinarily, the fuel and oxidant gases are humidified by flowing each gas on one side of a water vapor exchange membrane and by flowing deionized water on the opposite side of the membrane. Deionized water is preferred to prevent membrane contamination by undesired ions. In such membrane-based humidification arrangements, water is transferred across the membrane to the fuel and oxidant gases. NAFION is a suitable and convenient humidification membrane material in such applications, but other commercially available water exchange membranes are suitable as well. Other non-membrane based humidification techniques could also be employed, such as exposing the gases directly to water in an evaporation chamber to permit the gas to absorb evaporated water.

It is generally preferred to humidify the fuel and oxidant gases at, or as close as possible to, the operating temperature and pressure of the fuel cell. The ability of gases such as air to absorb water varies significantly with changes in temperature, especially at low operating pressures. Humidification of the air (oxidant) stream at a temperature significantly below fuel cell operating temperature could result in a humidity level sufficiently low to dehydrate the membrane when the stream is introduced to the cell.

In the oxidant stream that is directed through the cathode layer of a fuel cell, there is generally an inverse relationship between the concentration of oxygen and the water content of the oxidant stream. In this regard, the highest concentration of oxygen will normally be found at the inlet of the oxidant stream to the cathode layer. Assuming that no additional sources of fresh oxygen are introduced to the oxidant stream between the inlet and the outlet, the concentration of oxygen in the oxidant stream will become progressively diminished as the oxygen is consumed by the electrochemical reaction at the cathode. In these circumstances, the lowest concentration of oxygen will be found at the outlet of the oxidant stream from the cathode layer. Conversely, the lowest water content will normally be found at the inlet in the oxidant stream to the cathode. As water is generated by the electrochemical reaction at the cathode, the water content will increase as the oxidant stream is directed to the outlet, where the oxidant stream will have the highest water content. Preferably, the temperature of the oxidant stream should be increased (i.e., a positive temperature gradient should be established) between the oxidant stream inlet and oxidant stream outlet of the cathode layer, since the capacity of a gas stream to absorb water increases as its temperature increases.

In conventional fuel cell stacks, the approach to thermal management is to provide isothermal conditions across the entire active area of the cell. For example, in U.S. Pat. No. 5,230,966, a coolant fluid flow field plate is disclosed which has a rib-cage flow channel configuration in an attempt to more uniformly cool, and thereby provide isothermal conditions, across the central, active area of the cell.

The attempt to create isothermal conditions across the cell active area often leads to the existence of zones having different operating conditions, which can be characterized as follows:

Initial Zone (just downstream from the oxidant stream inlet)—the incoming oxidant stream is generally not saturated with water at the operating temperature of the fuel cell and is capable of absorbing product water, formed at the cathode, without saturating the oxidant stream. Under these conditions, however, water will also evaporate from the membrane electrolyte. This dehydration of the electrolyte increases electrolyte resistance, decreases performance and may decrease electrolyte lifetime.

Intermediate Zone (between the oxidant stream inlet and outlet)—eventually, the water content in the oxidant stream will rise to the point where, at the fuel cell operating temperature, the oxidant stream relative humidity will be sufficient to remove the product water without dehydrating the membrane. In this preferred situation, some of the water may be removed in the form of entrained liquid water droplets.

Final Zone (just upstream from the oxidant stream outlet)—the product water generated by the fuel cell has exceeded the water carrying capacity of the oxidant stream at the fixed operating temperature of the fuel cell. No additional product water can therefore be absorbed into the oxidant stream. As a consequence, liquid water may accumulate, resulting in diminished localized fuel cell performance due to impeding access of the oxidant stream to the active electrocatalytic sites at the membrane/electrode interface, and/or the formation of blockages which inhibit the flow of the oxidant stream through some channels in a multiple channel flow field (i.e., flooding).

In the present, improved electrochemical fuel cell stack, the temperature in each of the Initial, Intermediate and Final Zones is deliberately adjusted independently of the others in order to achieve satisfactory localized performance in all of the zones. In this regard, the following conditions are sought:

Initial Zone—decreasing the temperature in this zone results in higher relative humidity to adequately hydrate the membrane, thereby improving localized performance and extending the life of the membrane by avoiding drying out of the membrane;

Intermediate Zone—no change in temperature is sought in this zone;

Final Zone—increasing the temperature in this zone causes more water to become absorbed into the oxidant stream, and to be carried out of the cell via the oxidant stream outlet, without causing flooding and/or difficulties in accessing the membrane/electrode interface.

In the present, improved fuel cell stack, biased cooling is achieved by controlling the cooling mechanism associated with each fuel cell. Biased cooling is achieved by adjusting the flow path of the coolant stream and by adjusting the mass flow rate of the coolant stream. In particular, a concurrent or co-flow approach is employed, so that the incoming coolant stream, which enters the coolant flow field channels at its coolest temperature, is flowed adjacent the Initial Zone. As the coolant stream reaches the Intermediate Zone, it has been warmed from the absorption of heat from the electrochemical reaction of hydrogen and oxygen, and the coolant stream will continue to absorb heat and increase in temperature as it flows toward the coolant stream outlet.

As the heated coolant stream flows adjacent the Final Zone, where the coolant stream at its hottest temperature, more water is permitted to enter the vapor state and be carried out of the cell without flooding and/or mass transport problems. The magnitude of the temperature difference between the coolant stream inlet and the coolant stream outlet is adjusted by varying the coolant stream flow rate and can be set to produce the optimal aggregate performance of all zones operating in concert.

As indicated above, the coolant stream in the present, improved fuel-cell stack is directed such that the coolest region of each cooling layer substantially coincides with the region of the adjacent cathode layer in which the oxidant stream has the lowest water content. At the same time, the coolant stream is directed such that the warmest region of each cooling layer substantially coincides with the region of the adjacent cathode layer in which the oxidant stream has the highest water content.

The region of the cathode layer in which the oxidant stream has the lowest water content generally corresponds to the region in which the oxidant stream has the highest concentration of oxygen, typically nearest the inlet of the oxidant stream to the cathode layer. Conversely, the region of the cathode layer in which the oxidant stream has the highest water content generally corresponds to the region in which the oxidant stream has the lowest concentration of oxygen, typically nearest the outlet of the oxidant stream from the cathode layer.

Accordingly, it is an object of the present invention to provide an improved electrochemical fuel cell in which the temperature and mass flow rate of the coolant stream are controlled to optimize the management of water along at least a substantial portion of the reactant stream flow path.

It is also an object of the invention to provide an improved electrochemical fuel cell in which the coolant stream is directed with respect to the oxidant stream such that the temperature profile of the coolant stream matches that required to achieve satisfactory water management conditions along at least a substantial portion of the oxidant stream flow path.

SUMMARY OF THE INVENTION

The above and other objects are achieved by an electrochemical fuel cell stack comprising at least one fuel cell assembly. The assembly comprises:

A. at least one fuel cell comprising:
1. an anode layer comprising a fuel stream inlet and means for flowing within the anode layer a fuel stream introduced at the fuel stream inlet, the fuel stream comprising hydrogen;
2. a cathode layer comprising an oxidant stream inlet, an oxidant stream outlet, and means for flowing a oxidant stream from the oxidant stream inlet to the oxidant stream outlet, the oxidant stream comprising oxygen and water formed by the electrochemical reaction of the hydrogen and the oxygen; and
3. an electrolyte interposed between the anode layer and the cathode layer; and B. a cooling layer disposed adjacent the cathode layer, the cooling layer comprising a coolant stream inlet; a coolant stream outlet, and means for flowing a coolant stream from the coolant stream inlet to the coolant stream outlet.

The coolant stream flowing means directs the coolant stream such that the coolest region of the cooling layer substantially coincides with the region of the cathode layer in which the oxidant stream has the lowest water content, and the warmest region of the cooling layer substantially coincides with the region of the cathode layer in which the oxidant stream has the highest water content.

The electrolyte is preferably an ion exchange membrane.

In a first preferred fuel cell stack, the at least one coolant stream inlet comprises a plurality of coolant stream inlets, and the coolant stream flowing means comprises plural means for flowing the coolant stream from one of the plurality of coolant stream inlets to the at least one coolant stream outlet. The at least one coolant stream outlet preferably comprises a plurality of coolant stream outlets such that the coolant stream flows from one of the plurality of coolant stream inlets to one of the plurality of coolant stream outlets.

In a second preferred fuel cell stack, the at least one oxidant stream inlet comprises a plurality of oxidant stream inlets, the oxidant stream flowing means comprises plural means for flowing the oxidant stream from one of the plurality of oxidant stream inlets to the at least one oxidant stream outlet, the at least one coolant stream inlet comprises a plurality of coolant stream inlets, and the coolant stream flowing means comprises plural means for flowing the coolant stream from one of the plurality of coolant stream inlets to the at least one coolant stream outlet. The at least one oxidant stream outlet and the at least one coolant stream outlet are preferably centrally disposed in the cathode layer and the cooling layer, respectively. The at least one coolant stream outlet preferably comprises a plurality of coolant stream outlets and the plural coolant stream flowing means preferably directs the coolant stream from one of the plurality of coolant stream inlets to one of the plurality of coolant stream outlets.

In a third preferred fuel cell stack, the oxidant stream flowing means comprises at least one channel formed in the cathode layer for directing the oxidant stream from the at least one oxidant stream inlet to the oxidant stream outlet. The coolant stream flowing means preferably comprises at least one channel formed in the cooling layer for directing the coolant stream from the coolant stream inlet to the coolant stream outlet. The at least one coolant stream channel can comprise a plurality of coolant stream channels extending between the distal portion of an inlet header channel extending from the coolant stream inlet and the distal portion of an outlet header channel extending from the coolant stream outlet. The at least one oxidant stream channel and the at least one coolant stream channel can also traverse the cathode layer and the cooling layer, respectively, in a plurality of serpentine passes. In the serpentine configuration, the at least one oxidant stream channel and the at least one coolant stream channel can extend such that the at least one oxidant stream channel and the at least one coolant stream channel substantially coincide, whereby the oxidant stream and the coolant stream flow concurrently along a substantial portion of their respective lengths. The at least one oxidant stream channel and the at least one coolant stream channel can also extend such that the at least one coolant stream channel is disposed between sequential passes of the oxidant stream channel along a substantial portion of the length of the coolant stream channel.

In a fourth preferred fuel cell stack, the at least one oxidant stream channel traverses the cathode layer in a plurality of serpentine passes and the at least one coolant stream channel comprises a plurality of coolant stream channels. The plurality of coolant stream channels preferably extends substantially in parallel. The plurality of coolant stream channels can extend in parallel between an inlet header channel extending from the coolant stream inlet and an outlet header channel extending from the coolant stream outlet.

In a fifth preferred fuel cell stack, the at least one oxidant stream channel and the at least one coolant stream channel traverse the cathode layer and the cooling layer, respectively, in a plurality of spiral passes. The at least one oxidant stream channel and the at least one coolant stream channel can extend such that the at least one coolant stream channel and the at least one oxidant stream channel substantially coincide, whereby the coolant stream and the oxidant stream flow concurrently along a substantial portion of their respective lengths. The at least one oxidant stream channel and the at least one coolant stream channel can also extend such that the at least one coolant stream channel is disposed between sequential passes of the oxidant stream channel along a substantial portion of the length of the coolant stream channel.

In a sixth preferred fuel cell stack, the at least one oxidant stream inlet and the at least one coolant stream inlet are centrally disposed in the cathode layer and the cooling layer, respectively, the at least one oxidant stream channel traverses the cathode layer in a plurality of spiral passes, and the at least one coolant stream channel traverses the cooling layer in a plurality of channels extending radially from the at least one centrally disposed coolant stream inlet.

In a seventh preferred fuel cell stack, the at least one coolant stream channel comprises a plurality of coolant stream channels.

In an eighth preferred fuel cell stack, the at least one oxidant stream channel and the at least one coolant stream channel extend in serpentine paths between their respective inlets and outlets.

A first preferred cathode layer comprises:

a. an electrically conductive, substantially fluid impermeable cathode fluid flow field plate having formed therein, on the surface thereof facing the electrolyte, the oxidant stream inlet, the oxidant stream outlet, and the at least one oxidant stream channel; and b. a sheet of porous electrically conductive material interposed between the cathode fluid flow field plate and the electrolyte, the porous material sheet having a quantity of electrocatalyst deposited on the surface thereof facing the electrolyte.

A preferred coolant layer comprises:

c. an electrically conductive, substantially fluid impermeable coolant fluid flow field plate having formed therein the coolant stream inlet, the coolant stream outlet, and the at least one coolant stream channel.

The preferred cooling layer further comprises means for forming a seal between the coolant fluid flow field plate and the cathode fluid flow field plate, whereby the coolant stream is inhibited from escaping to the environment surrounding the stack when the stack is in its assembled state.

A second preferred cathode layer comprises:

a. an electrically conductive, substantially fluid impermeable cathode separator plate; and b. a sheet of porous electrically conductive material interposed between the cathode separator plate and the electrolyte, the porous material sheet having a quantity of electrocatalyst deposited on the surface thereof facing the electrolyte, the porous material sheet having formed therein, on the surface thereof facing the cathode separator plate, the oxidant stream inlet, the oxidant stream outlet, and the at least one oxidant stream channel.

In another preferred fuel cell stack, the cathode layer comprises a sheet of porous material and wherein the oxidant stream flowing means comprises the interstices of the porous material sheet. The porous sheet material is preferably electrically conductive, most preferably carbon fiber paper.

The above and other objects are also achieved by an electrochemical fuel cell stack comprising at least one fuel cell assembly, the assembly comprising:

A. at least one fuel cell comprising:

1. an anode layer comprising at least one fuel stream inlet and means for flowing within the anode layer a fuel stream introduced at the at least one fuel stream inlet;

2. a cathode layer comprising at least one oxidant stream inlet, at least one oxidant stream outlet, and means for flowing an oxidant stream from the at least one oxidant stream inlet to the at least one oxidant stream outlet, the oxidant stream comprising oxygen;

3. an electrolyte interposed between the anode layer and the cathode layer; and

B. a cooling layer disposed adjacent the cathode layer, the cooling layer comprising at least one coolant stream inlet, at least one coolant stream outlet, and means for flowing a coolant stream from the at least one coolant stream inlet to the at least one coolant stream outlet.

The coolant stream flowing means directs the coolant stream such that the coolest region of the cooling layer substantially coincides with the region of the cathode layer in which the oxidant stream has the highest concentration of oxygen, and the warmest region of the cooling layer substantially coincides with the region of the cathode layer in which the oxidant stream has the lowest concentration of oxygen.

In the preferred electrochemical fuel cell stack, the electrolyte is an ion exchange membrane.

The above and other objects are also achieved by an electrochemical fuel cell stack comprising at least one fuel cell assembly, the assembly comprising:

A. at least one fuel cell comprising:

1. a first electrode layer comprising at least one first reactant stream inlet and means for flowing within the first electrode layer a first reactant stream introduced at the at least one first reactant stream inlet;

2. a second electrode layer comprising at least one second reactant stream inlet, at least one second reactant stream outlet, and means for flowing a second reactant stream from the at least one second reactant stream inlet to the at least one second reactant stream outlet, the second reactant stream comprising water formed by the electrochemical reaction of the first reactant and the second reactant;

3. an electrolyte interposed between the first electrode layer and the second electrode layer; and B. a cooling layer disposed adjacent the second electrode layer, the cooling layer comprising at least one coolant stream inlet, at least one coolant stream outlet, and means for flowing a coolant stream from the at least one coolant stream inlet to the at least one coolant stream outlet;

wherein the coolant stream flowing means directs the coolant stream such that the coolest region of the cooling layer substantially coincides with the region of the second reactant layer in which the second reactant stream has the lowest water content, and the warmest region of the cooling layer substantially coincides with the region of the second electrode layer in which the second reactant stream has the highest water content.

In the preferred fuel cell stack, the electrolyte is an ion exchange membrane.

In an electrochemical fuel cell stack in which product water formed at the cathode is transported across the electrolyte and removed in the anode exhaust stream, the first electrode layer is a cathode layer, the first reactant stream is an oxidant stream comprising oxygen, the second electrode layer is an anode layer, and the second reactant stream is a fuel stream comprising hydrogen.

The above and other objects are further achieved by a first method of controlling the water content of a reactant stream in an electrode layer of an electrochemical fuel cell assembly, the assembly further comprising a cooling layer comprising a coolant stream inlet and a coolant stream outlet. The method comprises:

flowing a coolant stream adjacent the electrode layer such that the coolest region of the cooling layer substantially coincides with the region of the electrode layer in which the reactant stream has the lowest water content and the warmest region of the cooling layer substantially coincides with the region of the electrode layer in which the reactant stream has the highest water content.

The first method preferably further comprises:

controlling the mass flow rate of the adjacent coolant stream such that a temperature gradient is induced in the coolant stream between the coolant stream inlet and the coolant stream outlet.

The above and other objects are still further achieved by a second method of controlling the water content of the oxidant stream in a cathode layer of an electrochemical fuel cell assembly. The oxidant stream comprises oxygen. The assembly further comprises a cooling layer comprising a coolant stream inlet and a coolant stream outlet.

The method comprises:

flowing a coolant stream adjacent the cathode layer such that the coolest region of the cooling layer substantially coincides with the region of the cathode layer in which the oxidant stream has the highest concentration of oxygen and the warmest region of the cooling layer substantially coincides with the region of the cathode layer in which the oxidant stream has the lowest concentration of oxygen.

The second method preferably further comprises:

controlling the mass flow rate of the adjacent coolant stream such that a temperature gradient is induced in the coolant stream between the coolant stream inlet and the coolant stream outlet.

DETAILED DESCRIPTION OF THE PREFERRED EMBODIMENTS

Figure 1:
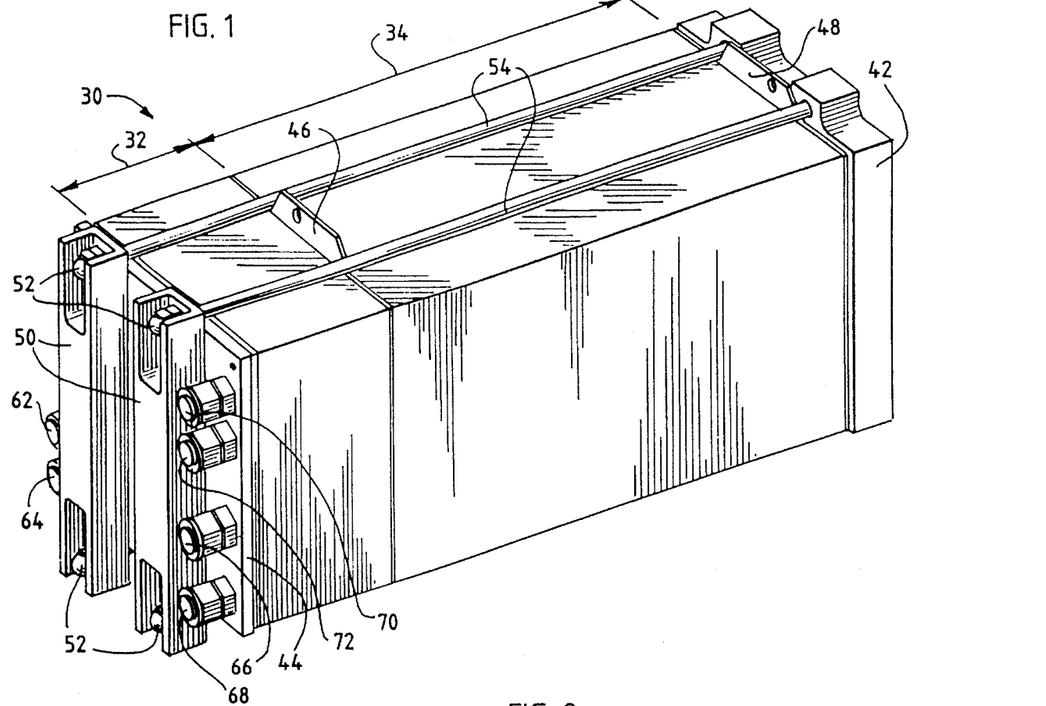
FIG. 1 is a perspective view of a preferred embodiment of an electrochemical fuel cell stack with concurrent coolant/oxidant fluid flow field channels.

Turning first to FIG. 1, an electrochemical fuel cell stack 30 has a humidification section 32 located upstream from the electrochemically active section 34. Stack 30 is a modular plate and frame design, and includes a compression end plate 42 and a fluid end plate 44. Compression end plate 42 has a pneumatic bladder (not shown) mounted on its surface facing active section 34, which compresses the plates which make up fuel cell stack 30, thereby promoting sealing and electrical contact between the plates of the stack. Bus plates 46 and 48, which are located on opposite ends of active section 34, provide the negative and positive contacts, respectively, to draw current generated by the assembly to a load (not shown in FIG. 1). Tie rods 54 extend between fluid end plate 44 and compression bars 50 to retain and secure stack 30 in its assembled state with fastening nuts 52.

As shown in FIG. 1, fluid end plate 44 has extending therefrom the six inlet and outlet ports for connecting the incoming and outgoing reactant and coolant streams to the stack. The ports are inlet fuel stream port 62, outlet fuel stream port 64, inlet oxidant stream port 66, outlet oxidant stream port 68, inlet coolant stream port 70, and outlet coolant stream port 72.

Figure 2:
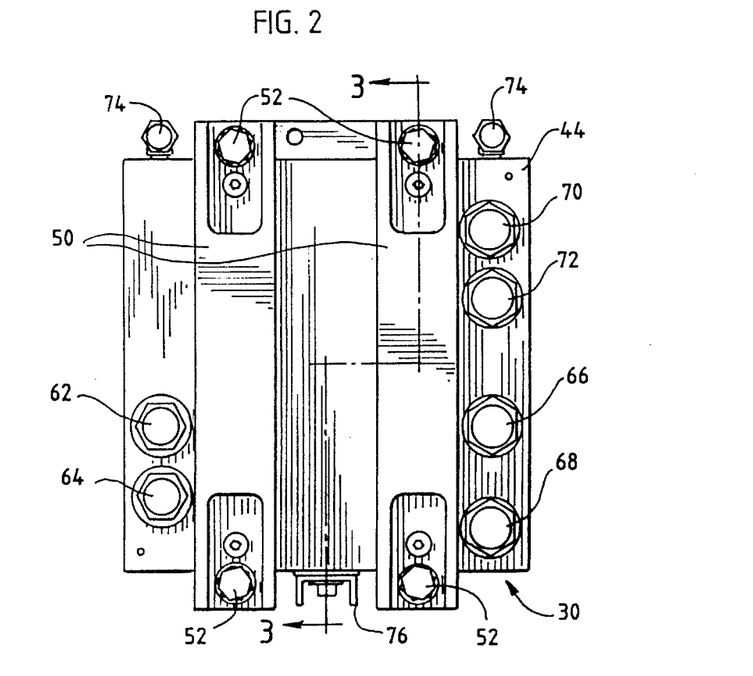
FIG. 2 is an front end elevation view of the electrochemical fuel cell stack illustrated in FIG. 1.

FIG. 2 is a front end elevation view of the electrochemical fuel cell stack illustrated in FIG. 1. FIG. 2 shows fluid end plate 44 and compression bars 50 retaining and securing stack 30 in its assembled state with fastening nuts 52. Inlet fuel stream port 62, outlet fuel stream port 64, inlet oxidant stream port 66, outlet oxidant stream port 68, inlet coolant stream port 70, and outlet coolant stream port 72 extend from fluid end plate 44. Ports 74 and support channel member 76 are described in more detail below in connection with FIGS. 5 and 6.

Figure 3:
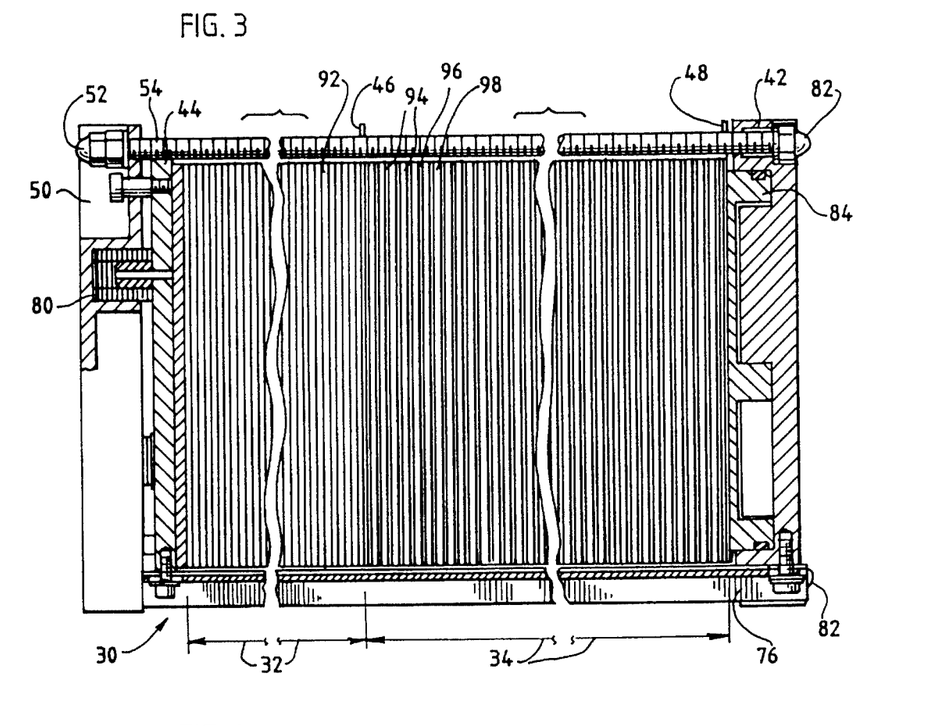
FIG. 3 is a Sectional view of the electrochemical fuel cell stack taken in the direction of arrows A—A in FIG. 2.

FIG. 3 is a sectional view of the stack 30 taken in the direction of arrows A—A in FIG. 2. As shown in FIG. 3, active section 34 includes, in addition to bus plates 46 and 48, a plurality of recurring fuel cell units. Each cell consists of a membrane electrode assembly 96 interposed between two reactant flow field plates 94. A coolant flow field plate 98 is inserted at regular intervals to provide a cooling layer (sometimes also referred to as a cooling cell or jacket) for removing heat generated by the electrochemical reaction occurring in the cells of the active section 34. The cells of the active section 34 are electrically coupled in series by virtue of the contact between the electrically conductive sheets that form the layers of the cells.

As shown in FIG. 3, humidification section 32 includes a plurality of humidification cells, one of which is designated in FIG. 3 as humidification cell 92. Each humidification cell 92 consists of a reactant fluid flow field plate (not shown in FIG. 3), a water flow field plate (not shown), and a water vapor transport membrane (not shown) interposed between the reactant fluid flow field plate and the water flow field plate. In humidification section 32, water vapor is imparted to the fuel and oxidant streams prior to introducing the reactant streams to active section 34.

Further components of the compression bars 50 and the compression end plate 42 are also shown in FIG. 3. Each compression bar 50 has a plurality of disc-spring washers 80 stacked in a cavity formed in its underside to urge the compression bar 50 away from the remainder of stack 30, thereby compressing the layers to promote sealing of the stack. Compression end plate 42 has a pneumatic piston 84 positioned within it to apply uniform pressure to the assembly, thereby promoting sealing. Support channel member 76, the ends of which are also shown in FIGS. 2 and 4, extends the length of humidification section 32 and active section 34 in order to preserve the alignment and prevent the sagging of the plates which make up stack 30.

Figure 4:
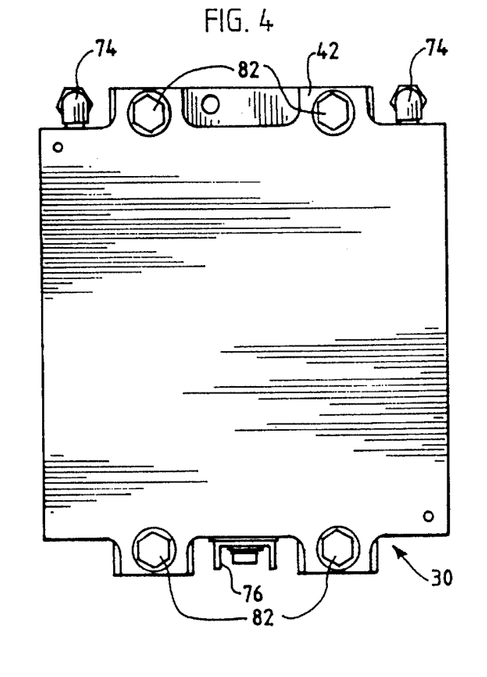
FIG. 4 is a rear end elevation view of the electrochemical fuel cell stack illustrated in FIGS. 1–3, showing the end opposite that illustrated in FIG. 2.

FIG. 4 is a rear end elevation view of stack 30 illustrated in FIG. 1, showing the end opposite that illustrated in FIG. 2. Compression end plate 42 is retained and secured to the remainder of stack 30 by bolt heads 82 located at the end of tie rods 54 opposite fastening nuts 52 (not shown in FIG. 4). Ports 74, also shown in FIG. 2, allow the introduction of pressurized fluid to the bladder between pneumatic piston 84 and compression end plate 42 (see FIG. 3), thereby promoting sealing and electrical contact between the plates which make up stack 30.

Figure 5:
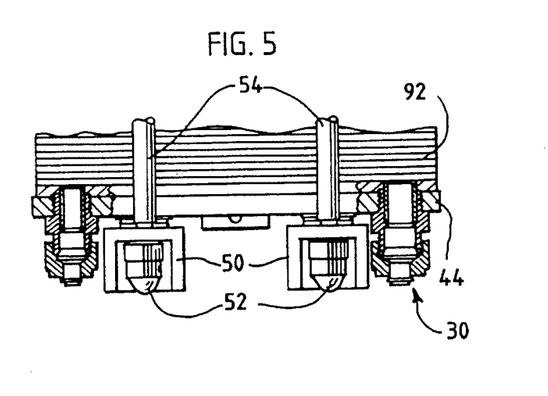
FIG. 5 is a partial top view, partially in section of the electrochemical fuel cell stack illustrated in FIGS. 2–4.

FIG. 5 is a partial top view, partially in section, of stack 30 illustrated in FIGS. 3–5. A portion of the humidification section, which includes humidification cell 92, is illustrated in FIG. 5. FIG. 5 also shows compression bars 50 secured to stack 30 by nuts 52 at the end of tie rods 54.

Figure 6A:
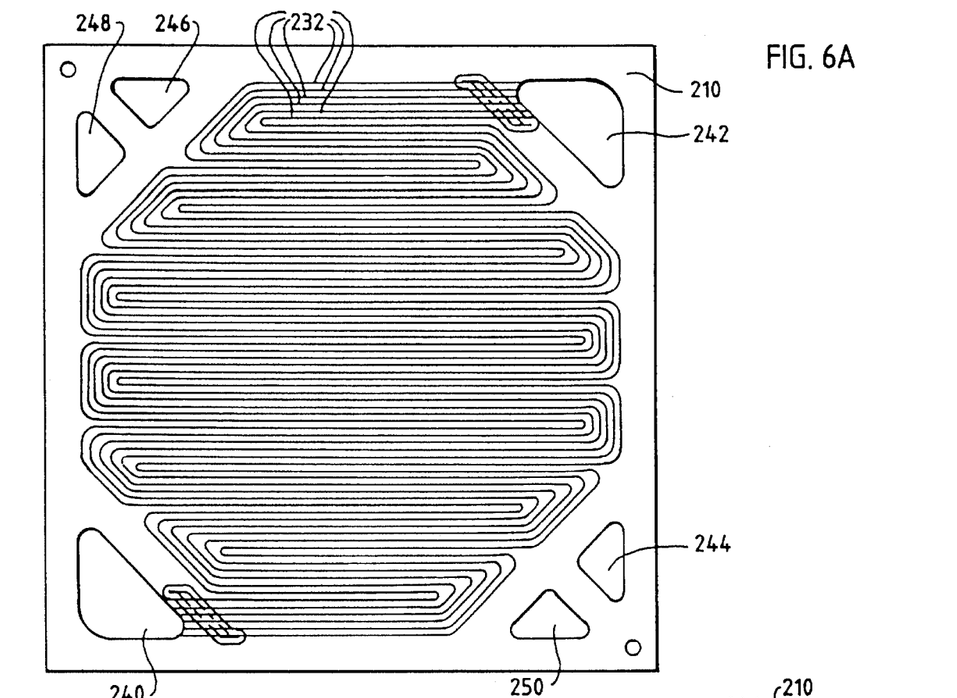
FIG. 6A is an end elevation view of one side of an oxidant/coolant fluid flow field plate from the active section of the fuel cell stack illustrated in FIGS. 1–5, showing the configuration of the channels which form the oxidant stream flow field, as well as the six manifold openings for the fuel, oxidant and coolant streams.

FIG. 6A shows one side of an oxidant/coolant fluid flow field plate 210 from the active section of the fuel cell stack illustrated in FIGS. 1–5. The manifold openings in plate 210 are humidified fuel manifold opening 244, outlet fuel manifold opening 246, humidified oxidant manifold opening 240, outlet oxidant manifold opening 242, inlet coolant manifold opening 248, and coolant/humidification fluid manifold opening 250. The surface of plate 210 illustrated in FIG. 6A has formed therein a plurality of oxidant fluid flow channels 232 which traverse a serpentine path across the central, electrochemically active area of plate 210.

Figure 6B:
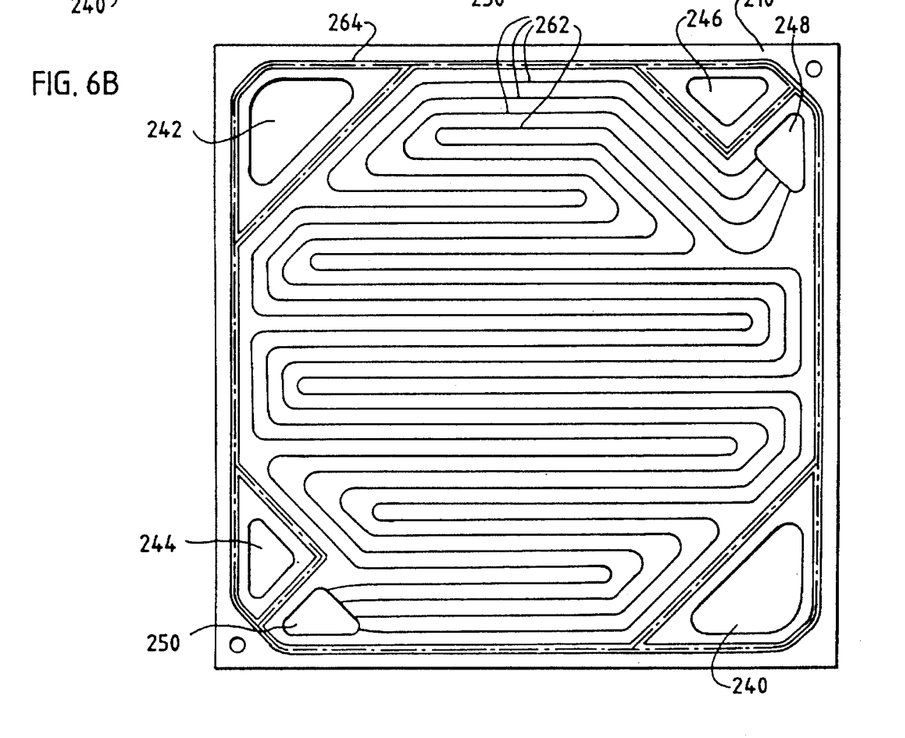
FIG. 6B is an end elevation view of the opposite side of the oxidant/coolant fluid flow field plate shown in FIG. 6A, showing the configuration of the channels which form the coolant stream flow field.

FIG. 6B is an end elevation view of the opposite side of the oxidant/coolant fluid flow field plate 210 shown in FIG. 6A. In addition to the six manifold openings illustrated and described above for FIG. 6A, the opposite surface of plate 210 shown in FIG. 6B has formed therein a plurality of coolant fluid flow channels 262 which traverse a serpentine path across the central, electrochemically active area of plate 210. As shown in FIGS. 6A and 6B, except for a short length of the coolant fluid flow channels in the vicinity of opening 248, the serpentine configuration of the coolant fluid flow channels correspond substantially to the serpentine configuration of the oxidant fluid flow field channels on the opposite major surface of plate 210. Thus, the coolant stream is directed through flow channels 262 such that the coolest portion of the coolant stream substantially coincides with the portion of the oxidant stream having the highest concentration of oxygen (and also the lowest water content), and the warmest portion of the coolant stream substantially coincides with the portion of the oxidant stream having the lowest concentration of oxygen (and also the highest water content).

As shown in FIG. 6B, a sealant material or gasket 264 circumscribes each of the reactant manifold openings to isolate the central, coolant flow field portion of plate 210 from the reactant streams flowing through the manifolds. The sealant material or gasket 264 also inhibits the coolant stream from escaping to the environment surrounding the stack when the stack is in its assembled state.

Figure 7:
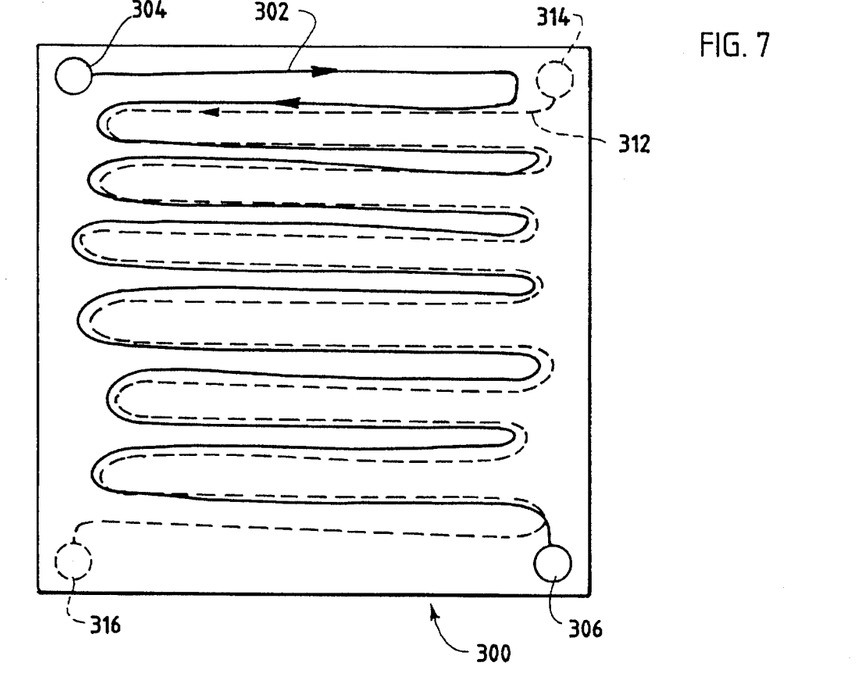
FIG. 7 is an end view of a coolant flow field plate having a serpentine channel extending between a coolant stream inlet and a diagonally opposed coolant stream outlet, and, in phantom lines, an adjacent oxidant flow field plate having a serpentine channel extending between an oxidant stream inlet and a diagonally opposed oxidant stream outlet, in which the coolant stream channel and the oxidant stream channel substantially coincide.

FIG. 7 shows an end view of a coolant flow field plate 300 having a serpentine channel 302 extending between a coolant stream inlet 304 and a diagonally opposed coolant stream outlet 306. In phantom lines, an adjacent oxidant flow field plate has a serpentine channel 312 extending between an oxidant stream inlet 314 and a diagonally opposed oxidant stream outlet 316. The coolant stream channel 302 and the oxidant stream channel 312 extend such that the coolest region of the coolant flow field plate 300, which corresponds to the portion of coolant stream channel 302 nearest coolant stream inlet 304, substantially coincides with the region of the adjacent oxidant flow field plate having the highest concentration of oxygen (and also the lowest water content), which corresponds to the portion of oxidant stream channel 312 nearest oxidant stream inlet 314. Similarly, the warmest region of coolant flow field plate 300, which corresponds to the portion of coolant stream channel 302 nearest coolant stream outlet 306, substantially coincides with the region of the adjacent oxidant flow field plate having the lowest concentration of oxygen (and also the highest water content), which corresponds to the portion of oxidant stream channel 312 nearest oxidant stream outlet 316.

Figure 8:
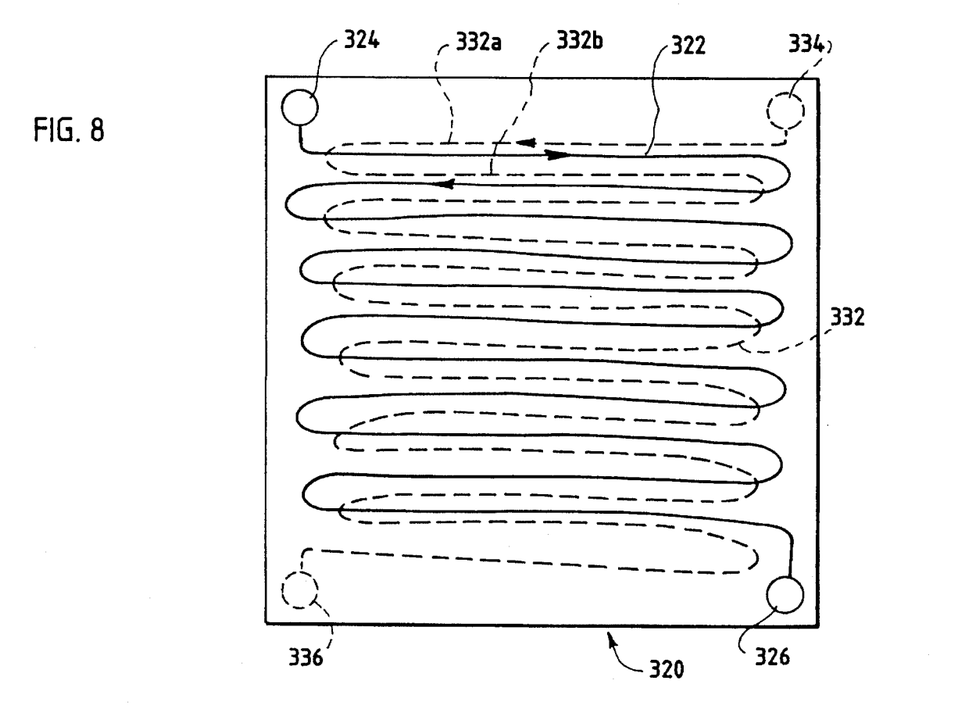
FIG. 8 is an end view of a coolant flow field plate having a serpentine channel extending between a coolant stream inlet and a diagonally opposed coolant stream outlet, and, in phantom lines, an adjacent oxidant flow field plate having a serpentine channel extending between an oxidant stream inlet and a diagonally opposed oxidant stream outlet, in which the coolant stream channel is disposed between sequential passes of the oxidant stream channel.

FIG. 8 shows an end view of a coolant flow field plate 320 having a serpentine channel 322 extending between a coolant stream inlet 324 and a diagonally opposed coolant stream outlet 326. In phantom lines, an adjacent oxidant flow field plate has a serpentine channel 332 extending between an oxidant stream inlet 334 and a diagonally opposed oxidant stream outlet 336. The coolant stream channel 322 is disposed between sequential passes 332a and 332b of the oxidant stream channel 332. As in FIG. 7, the coolest region of the coolant flow field plate 320, which corresponds to the portion of coolant stream channel 322 nearest coolant stream inlet 324, substantially coincides with the region of the adjacent oxidant flow field plate having the highest concentration of oxygen (and also the lowest water content), which corresponds to the portion of oxidant stream channel 332 nearest oxidant stream inlet 334. Similarly, the warmest region of coolant flow field plate 320, which corresponds to the portion of coolant stream channel 322 nearest coolant stream outlet 326, substantially coincides with the region of the adjacent oxidant flow field plate having the lowest concentration of oxygen (and also the highest water content), which corresponds to the portion of oxidant stream channel 332 nearest oxidant stream outlet 336.

Figure 9:
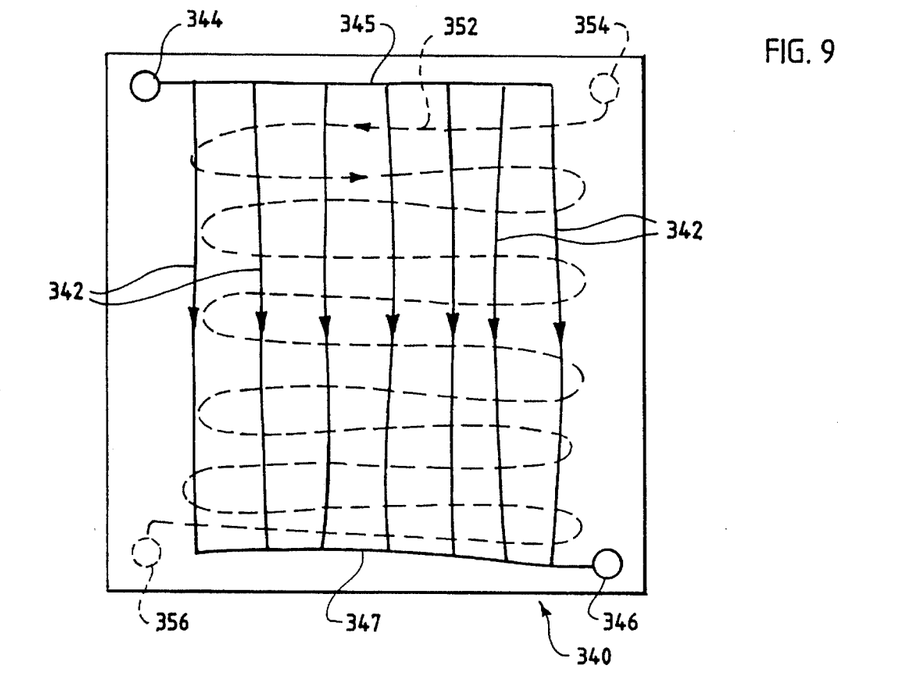
FIG. 9 is an end view of a coolant flow field plate having a plurality of channels extending substantially in parallel between an inlet header channel extending from a coolant stream inlet and an outlet header channel extending from a diagonally opposed coolant stream outlet, and, in phantom lines, an adjacent oxidant flow field plate having a serpentine channel extending between an oxidant stream inlet and a diagonally opposed oxidant stream outlet.

FIG. 9 shows an end view of a coolant flow field plate 340 having a plurality of channels 342 extending substantially in parallel between an inlet header channel 345 extending from a coolant stream inlet 344 and an outlet header channel 347 extending from a diagonally opposed coolant stream outlet 346. In phantom lines, an adjacent oxidant flow field plate has a serpentine channel 352 extending between an oxidant stream inlet 354 and a diagonally opposed oxidant stream outlet 356. As in FIGS. 7 and 8, the coolest region of the coolant flow field plate 340, which corresponds to the portion of coolant stream channel 342 nearest inlet header channel 345, substantially coincides with the region of the adjacent oxidant flow field plate having the highest concentration of oxygen (and also the lowest water content), which corresponds to the portion of oxidant stream channel 352 nearest oxidant stream inlet 354. Similarly, the warmest region of coolant flow field plate 340, which corresponds to the portion of coolant stream channel 342 nearest coolant stream outlet 346, substantially coincides with the region of the adjacent oxidant flow field plate having the lowest concentration of oxygen (and also the highest water content), which corresponds to the portion of oxidant stream channel 352 nearest oxidant stream outlet 356.

Figure 10:
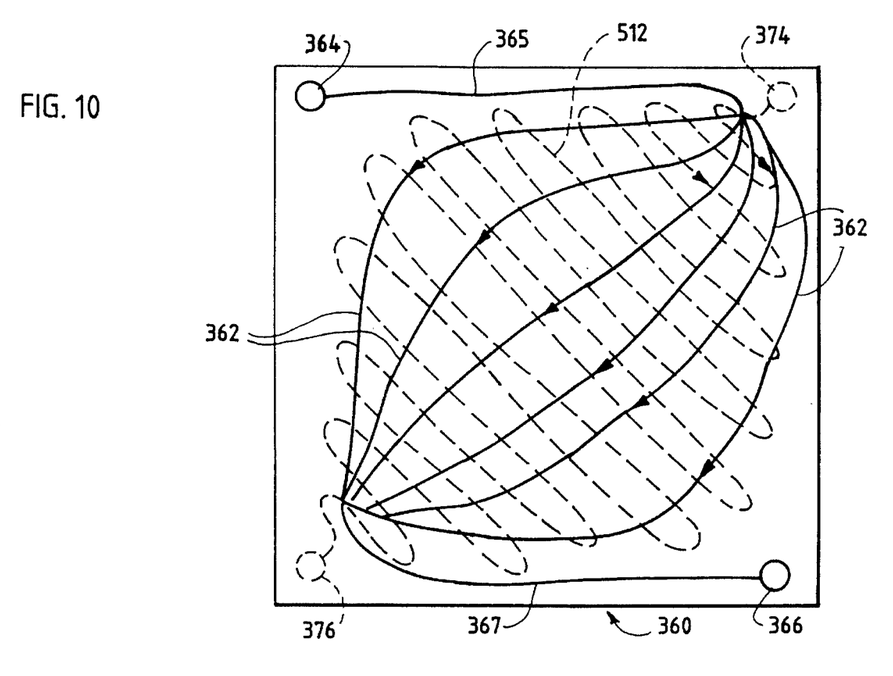
FIG. 10 is an end view of a coolant flow field plate having a plurality of channels radiating from the distal portion of an inlet header channel extending from a coolant stream inlet and converging at the distal portion of an outlet header channel extending from a diagonally opposed coolant stream outlet, and, in phantom lines, an adjacent oxidant flow field plate having a serpentine channel extending between an oxidant stream inlet and a diagonally opposed oxidant stream outlet.

FIG. 10 shows an end view of a coolant flow field plate 360 having a plurality of channels 362 radiating from the distal portion of an inlet header channel 365 extending from a coolant stream inlet 364 and converging at the distal portion of an outlet header channel 367 extending from a diagonally opposed coolant stream outlet 366. In phantom lines, an adjacent oxidant flow field plate has a serpentine channel 372 extending between an oxidant stream inlet 374 and a diagonally opposed oxidant stream outlet 376. As in FIGS. 7–9, the coolest region of the coolant flow field plate 360, which corresponds to the portion of each coolant stream channel 362 nearest the end portion of the inlet header channel 365, substantially coincides with the region of the adjacent oxidant flow field plate having the highest concentration of oxygen (and also the lowest water content), which corresponds to the portion of oxidant stream channel 372 nearest oxidant stream inlet 374. Similarly, the warmest region of coolant flow field plate 360, which corresponds to the portion of each coolant stream channel 362 nearest the beginning portion of outlet header channel 367, substantially coincides with the region of the adjacent oxidant flow field plate having the lowest concentration of oxygen (and also the highest water content), which corresponds to the portion of oxidant stream channel 372 nearest oxidant stream outlet 376.

Figure 11:
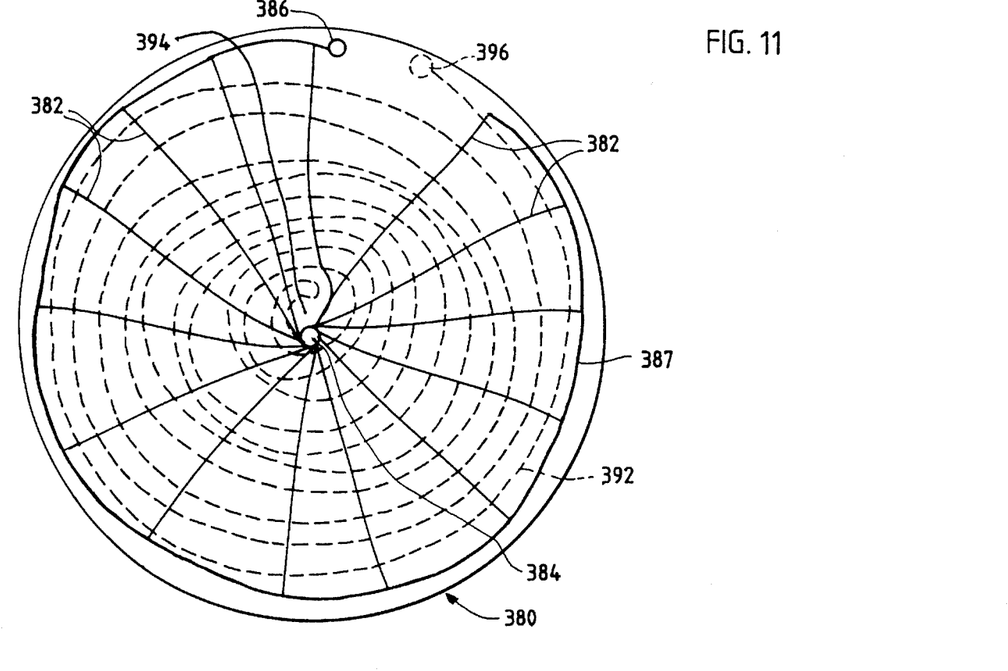
FIG. 11 is an end view of a coolant flow field plate having a plurality of channels extending radially from a centrally disposed coolant stream inlet to a circumferential outlet header channel extending from a peripherally disposed coolant stream outlet, and, in phantom lines, an adjacent oxidant flow field plate having a spiral channel extending from a centrally disposed oxidant stream inlet to a peripherally disposed oxidant stream outlet.

FIG. 11 shows an end view of a coolant flow field plate 380 having a plurality of channels 382 extending radially from a centrally disposed coolant stream inlet 384 to a circumferential outlet header channel 387 extending from a peripherally disposed coolant stream outlet 386. In phantom lines, an adjacent oxidant flow field plate has a spiral channel 392 extending from a centrally disposed oxidant stream inlet 394 to a peripherally disposed oxidant stream outlet 396. As in FIGS. 7–10, the coolest region of the coolant flow field plate 380, which corresponds to the portion of each coolant stream channel 382 nearest coolant stream inlet 384, substantially coincides with the region of the adjacent oxidant flow field plate having the highest concentration of oxygen (and also the lowest water content), which corresponds to the portion of oxidant stream channel 392 nearest oxidant stream inlet 394. Similarly, the warmest region of coolant flow field plate 380, which corresponds to the portion of each coolant stream channel 382 nearest the outlet header channel 387, substantially coincides with the region of the adjacent oxidant flow field plate having the lowest concentration of oxygen (and also the highest water content), which corresponds to the portion of oxidant stream channel 392 nearest oxidant stream outlet 396.

Figure 12:
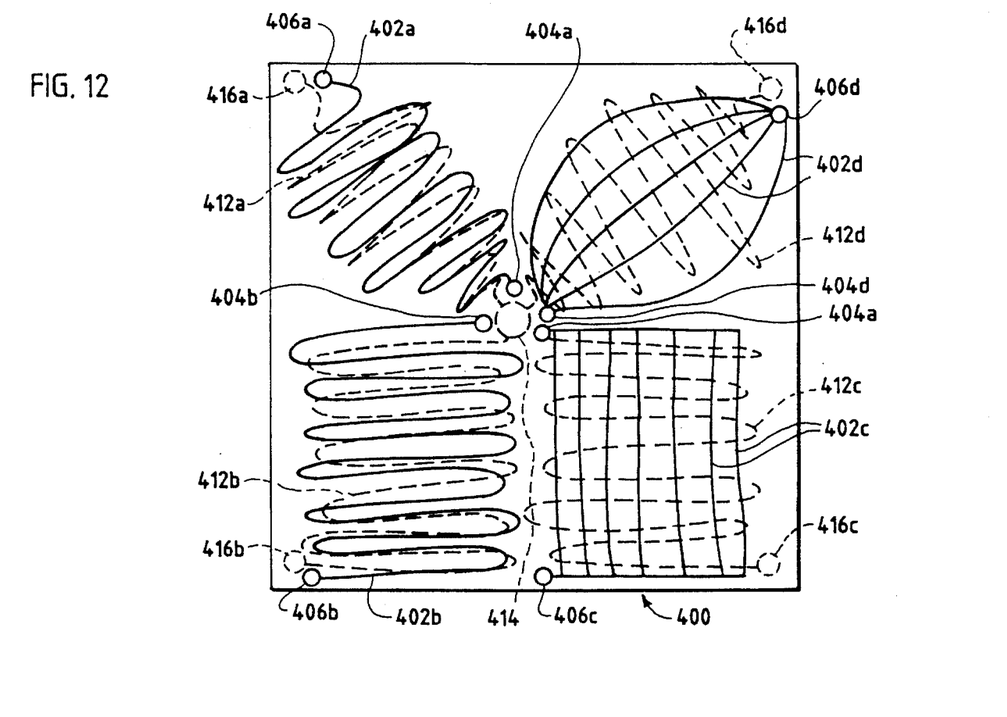
FIG. 12 is an end view of a multiplexed coolant flow field plate having four coolant stream channels formed therein, each of which extends between one of four separate, centrally disposed coolant stream inlets and one of four separate, peripherally disposed coolant stream outlets, the four coolant stream channels corresponding approximately to the configurations shown in FIGS. 7–10, and, in phantom lines, four serpentine oxidant stream channels, each of which extends between a centrally disposed oxidant stream inlet and one of four separate, peripherally disposed oxidant stream outlets.

FIG. 12 is an end view of a multiplexed coolant flow field plate 400 having four coolant stream channels 402a, 402b, 402c, 402d formed therein. Each of channels 402a, 402b, 402c, 402d extends between one of four separate, centrally disposed coolant stream inlets 404a, 404b, 404c, 404d and one of four separate, peripherally disposed coolant stream outlets 406a, 406b, 406c, 406d. The four coolant stream channels corresponding approximately to the configurations shown in FIGS. 7–10, channel 402a approximating channel 302 in FIG. 7, channel 402b approximating channel 322 in FIG. 8, channels 402c approximating channels 342 in FIG. 9, and channels 402d approximating channels 362 in FIG. 10. In phantom lines, four serpentine oxidant stream channels 412a, 412b, 412c, 412d extend between a centrally disposed oxidant stream inlet 414 and one of four separate, peripherally disposed oxidant stream outlets 416a, 416b, 416c, 416d, respectively. As in FIGS. 7–10, the coolest region of each of the multiplexed areas of the coolant flow field plate 400, which corresponds to the portion of each coolant stream channel nearest the respective coolant stream inlet, substantially coincides with the region of the adjacent oxidant flow field plate having the highest concentration of oxygen (and also the lowest water content), which corresponds to the portion of each oxidant stream channel nearest oxidant stream inlet 414. Similarly, the warmest region of each of the multiplexed area of the coolant flow field plate 400, which corresponds to the portion of each coolant stream channel nearest the respective coolant stream outlet, substantially coincides with the region of each of the multiplexed areas of the adjacent oxidant flow field plate having the lowest concentration of oxygen (and also the highest water content), which corresponds to the portion of each oxidant stream channel nearest the respective oxidant stream outlet.

Figure 13:
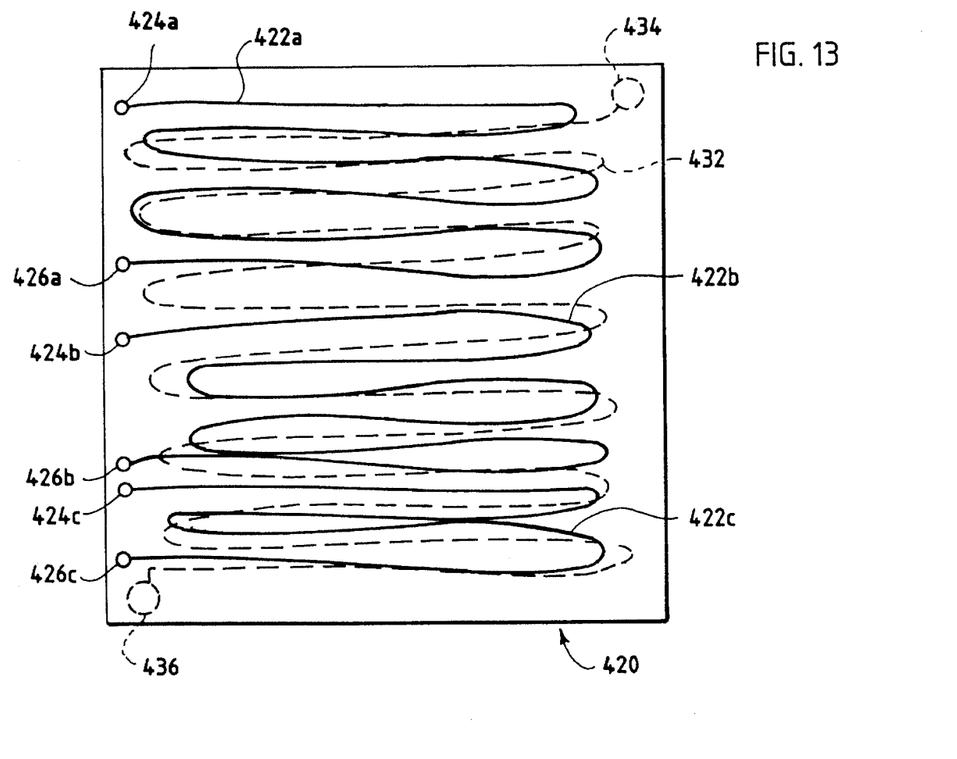
FIG. 13 is an end view of a coolant flow field plate having three serpentine channels, each of which extends between one of three separate, peripherally disposed coolant stream inlets and one of three separate, peripherally disposed coolant stream outlets, and, in phantom lines, an adjacent oxidant flow field plate having a serpentine channel extending between an oxidant stream inlet and a diagonally opposed oxidant stream outlet.

FIG. 13 shows an end view of a coolant flow field plate 420 having three serpentine channels 422a, 422b, 422c, each of which extends between one of three separate, peripherally disposed coolant stream inlets 424a, 424b, 424c and one of three separate, peripherally disposed coolant stream outlets 426a, 426b, 426c. In phantom lines, an adjacent oxidant flow field plate has a serpentine channel 432 extending between an oxidant stream inlet 434 and a diagonally opposed oxidant stream outlet 436. The mean temperature of the coolant stream 422a is cooler than the mean temperature of coolant stream 422b, and the mean temperature of coolant stream 422b is in turn cooler than the mean temperature of coolant stream 422c. In this configuration, the coolest region of the coolant flow field plate 420 substantially coincides with the region of the adjacent oxidant flow field plate having the highest concentration of oxygen (and also the lowest water content), which corresponds to the portion of oxidant stream channel 432 nearest oxidant stream inlet 434. Similarly, the warmest region of coolant flow field plate 420 substantially coincides with the region of the adjacent oxidant flow field plate having the lowest concentration of oxygen (and also the highest water content), which corresponds to the portion of oxidant stream channel 432 nearest oxidant stream outlet 436. Preferably, the temperature of the coolant entering flow channel 422*b* at coolant stream inlet 424*b* is greater than or equal to the temperature of the coolant exiting flow channel 422*a* at coolant stream outlet 426*a*. Similarly, the temperature of the coolant entering flow channel 422*c* at coolant stream inlet 424*c* is greater than or equal to the temperature of coolant exiting flow channel 422*b* at coolant stream outlet 426*b*.

In connection with the coolant stream inlet region, care must be taken so as not to overcool the Initial Zone and thereby depress the temperature of the supply header or manifold for introducing the oxidant stream to the inlet of the cathode. Such overcooling would cause loss of water content in the oxidant stream by inducing condensation on the cold header walls.

Figure 14:
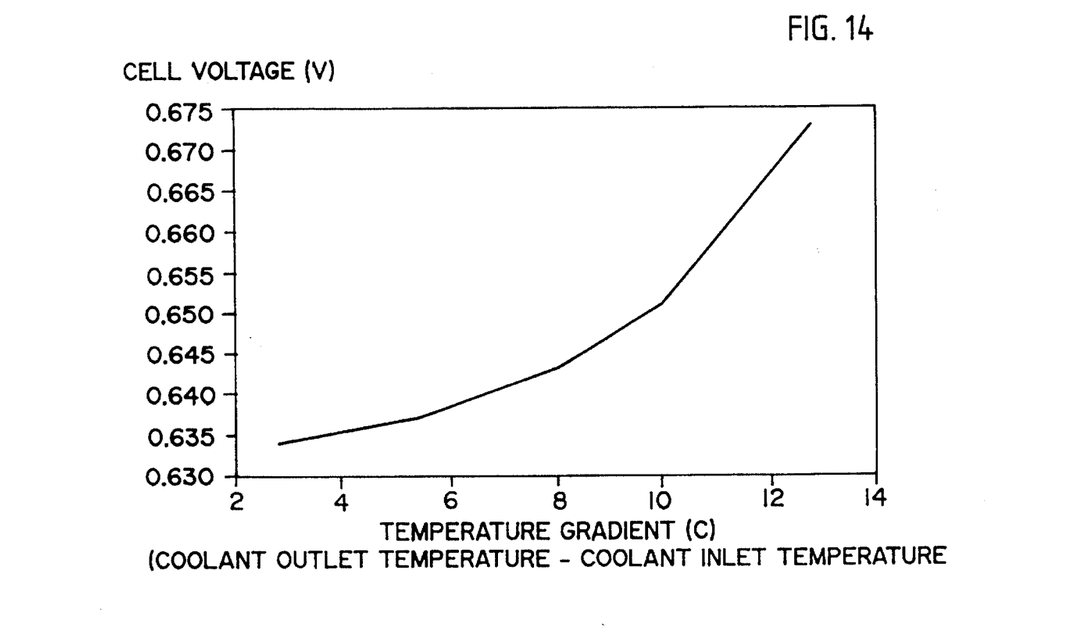
FIG. 14 is a plot of cell voltage as a function of the temperature gradient (the difference in temperature between the coolant stream outlet and the coolant stream inlet, showing improved cell performance as the magnitude of the temperature gradient is increased.

FIG. 14 shows the effect on cell performance of increasing the magnitude of the temperature gradient of the coolant stream between the outlet and the inlet to the cell. In the cell to which FIG. 14 relates:

current density=800 amps/ft$^2$,
utilization of oxygen in air stream=67%,
fuel utilization=77%,
fuel=100% (substantially pure) hydrogen,
inlet pressure=3.0 bar A (air and fuel),
coolant stream inlet temperature=80° C., and
inlet relative humidity=100% (air and fuel).

As shown in FIG. 14, the cell voltage increased as the difference (temperature gradient) was increased between the coolant stream temperature at the outlet from the fuel cell and the coolant stream temperature at the inlet to the fuel cell (80° C.). FIG. 14 therefore shows that cell performance improved with increasing coolant temperature gradients for a fuel cell in which the coolant stream is directed substantially concurrently with the adjacent oxidant stream.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell stack comprising at least one fuel cell assembly, said assembly comprising:

A. at least one fuel cell comprising:
1. an anode layer comprising at least one fuel stream inlet and means for flowing within said anode layer a fuel stream introduced at said at least one fuel stream inlet, said fuel stream comprising hydrogen;
2. a cathode layer comprising at least one oxidant stream inlet, at least one oxidant stream outlet, and means for flowing an oxidant stream from said at least one oxidant stream inlet to said at least one oxidant stream outlet, said oxidant stream comprising oxygen and water formed by the electrochemical reaction of said hydrogen and said oxygen;
3. an electrolyte interposed between said anode layer and said cathode layer; and B. a cooling layer disposed adjacent said cathode layer, said cooling layer comprising at least one coolant stream inlet, at least one coolant stream outlet, and means for flowing a coolant stream from said at least one coolant stream inlet to said at least one coolant stream outlet, said flowing means maintaining said coolant stream within a single flow field plate;

wherein said flowing means directs said coolant stream such that the coolest region of said cooling layer substantially coincides with the region of said cathode layer in which the oxidant stream has the lowest water content, and the warmest region of said cooling layer substantially coincides with the region of said cathode layer in which the oxidant stream has the highest water content.

2. The electrochemical fuel cell stack of claim 1 wherein said electrolyte is an ion exchange membrane.

3. The electrochemical fuel cell stack of claim 1 wherein said at least one coolant stream inlet comprises a plurality of coolant stream inlets, and said coolant stream flowing means comprises plural means for flowing said coolant stream from one of said plurality of coolant stream inlets to said at least one coolant stream outlet.

4. The electrochemical fuel cell stack of claim 3 wherein said at least one coolant stream outlet comprises a plurality of coolant stream outlets such that said coolant stream flows from one of said plurality of coolant stream inlets to one of said plurality of coolant stream outlets.

5. The electrochemical fuel cell stack of claim 1 wherein said at least one oxidant stream inlet comprises a plurality of oxidant stream inlets, said oxidant stream flowing means comprises plural means for flowing said oxidant stream from one of said plurality of oxidant stream inlets to said at least one oxidant stream outlet, said at least one coolant stream inlet comprises a plurality of coolant stream inlets, and said coolant stream flowing means comprises plural means for flowing said coolant stream from one of said plurality of coolant stream inlets to said at least one coolant stream outlet.

6. The electrochemical fuel cell stack of claim 5 wherein said at least one oxidant stream outlet and said at least one coolant stream outlet are centrally disposed in said cathode layer and said cooling layer, respectively.

7. The electrochemical fuel cell stack of claim 5 wherein said at least one coolant stream outlet comprises a plurality of coolant stream outlets and wherein said plural coolant stream flowing means directs said coolant stream from one of said plurality of coolant stream inlets to one of said plurality of coolant stream outlets.

8. The electrochemical fuel cell stack of claim 1 wherein said oxidant stream flowing means comprises at least one channel formed in said cathode layer for directing said oxidant stream from said at least one oxidant stream inlet to said oxidant stream outlet.

9. The electrochemical fuel cell stack of claim 8 wherein said coolant stream flowing means comprises at least one channel formed in said cooling layer for directing said coolant stream from said coolant stream inlet to said coolant stream outlet.

10. The electrochemical fuel cell stack of claim 9 wherein said at least one coolant stream channel comprises a plurality of coolant stream channels extending between the distal portion of an inlet header channel extending from said coolant stream inlet and the distal portion of an outlet header channel extending from said coolant stream outlet.

11. The electrochemical fuel cell stack of claim 9 wherein said at least one oxidant stream channel and said at least one coolant stream channel traverse said cathode layer and said cooling layer, respectively, in a plurality of serpentine passes.

12. The electrochemical fuel cell stack of claim 11 wherein said at least one oxidant stream channel and said at least one coolant stream channel extend such that said at least one oxidant stream channel and said at least one coolant stream channel substantially coincide, whereby said oxidant stream and said coolant stream flow concurrently along a substantial portion of their respective lengths.

13. The electrochemical fuel cell stack of claim 11 wherein said at least one oxidant stream channel and said at least one coolant stream channel extend such that said at least one coolant stream channel is disposed between sequential passes of said oxidant stream channel along a substantial portion of the length of said coolant stream channel.

14. The electrochemical fuel cell stack of claim 9 wherein said at least one oxidant stream channel traverses said cathode layer in a plurality of serpentine passes and said at least one coolant stream channel comprises a plurality of coolant stream channels.

15. The electrochemical fuel cell stack of claim 14 wherein said plurality of coolant stream channels extends substantially in parallel.

16. The electrochemical fuel cell stack of claim 15 wherein said plurality of coolant stream channels extends in parallel between an inlet header channel extending from said coolant stream inlet and an outlet header channel extending from said coolant stream outlet.

17. The electrochemical fuel cell stack of claim 9 wherein said at least one oxidant stream channel and said at least one coolant stream channel traverse said cathode layer and said cooling layer, respectively, in a plurality of spiral passes.

18. The electrochemical fuel cell stack of claim 17 wherein said at least one oxidant stream channel and said at least one coolant stream channel extend such that said at least one oxidant stream channel and said at least one coolant stream channel substantially coincide, whereby said coolant stream and said oxidant stream flow concurrently along a substantial portion of their respective lengths.

19. The electrochemical fuel cell stack of claim 18 wherein said at least one oxidant stream channel and said at least one coolant stream channel extend such that said at least one coolant stream channel is disposed between sequential passes of said oxidant stream channel along a substantial portion of the length of said coolant stream channel.

20. The electrochemical fuel cell stack of claim 9 wherein said at least one oxidant stream inlet and said at least one coolant stream inlet are centrally disposed in said cathode layer and said cooling layer, respectively, said at least one oxidant stream channel traverses said cathode layer in a plurality of spiral passes, and said at least one coolant stream channel traverses said cooling layer in a plurality of channels extending radially from said at least one centrally disposed coolant stream inlet.

21. The electrochemical fuel cell stack of claim 9 wherein said at least one coolant stream channel comprises a plurality of coolant stream channels.

22. The electrochemical fuel cell stack of claim 9 wherein said at least one oxidant stream channel and said at least one coolant stream channel extend in serpentine paths between their respective inlets and outlets.

23. The electrochemical fuel cell stack of claim 8 wherein said cathode layer comprises:
   a. an electrically conductive, substantially fluid impermeable cathode fluid flow field plate having formed therein, on the surface thereof facing said electrolyte, said oxidant stream inlet, said oxidant stream outlet, and said at least one oxidant stream channel; and
   b. a sheet of porous electrically conductive material interposed between said cathode fluid flow field plate and said electrolyte, said porous material sheet having a quantity of electrocatalyst deposited on the surface thereof facing said electrolyte.

24. The electrochemical fuel cell stack of claim 23 wherein said coolant layer comprises:
   c. an electrically conductive, substantially fluid impermeable coolant fluid flow field plate having formed therein said coolant stream inlet, said coolant stream outlet, and said at least one coolant stream channel.

25. The electrochemical fuel cell stack of claim 24 wherein said cooling layer further comprises means for forming a seal between said coolant fluid flow field plate and said cathode fluid flow field plate, whereby said coolant stream is inhibited from escaping to the environment surrounding the stack when the stack is in its assembled state.

26. The electrochemical fuel cell stack of claim 8 wherein said cathode layer comprises:
   a. an electrically conductive, substantially fluid impermeable cathode separator plate; and
   b. a sheet of porous electrically conductive material interposed between said cathode separator plate and said electrolyte, said porous material sheet having a quantity of electrocatalyst deposited on the surface thereof facing said electrolyte, said porous material sheet having formed therein, on the surface thereof facing said cathode separator plate, said oxidant stream inlet, said oxidant stream outlet, and said at least one oxidant stream channel.

27. The electrochemical fuel cell stack of claim 1 wherein said cathode layer comprises a sheet of porous material and wherein said oxidant stream flowing means comprises the interstices of said porous material sheet.

28. The electrochemical fuel cell stack of claim 27 wherein said porous sheet material is electrically conductive.

29. The electrochemical fuel cell stack of claim 28 wherein said porous sheet material is carbon fiber paper.

30. An electrochemical fuel cell stack comprising at least one fuel cell assembly, said assembly comprising:
   A. at least one fuel cell comprising:
      1. an anode layer comprising at least one fuel stream inlet and means for flowing within said anode layer a fuel stream introduced at least one fuel stream inlet;
      2. a cathode layer comprising at least one oxidant stream inlet, at least one oxidant stream outlet, and means for flowing a oxidant stream from said at least one oxidant stream inlet to said at least one oxidant stream outlet, said oxidant stream comprising oxygen;
      3. an electrolyte interposed between said anode layer and said cathode layer; and
   B. a cooling layer disposed adjacent said cathode layer, said cooling layer comprising at least one coolant stream inlet, at least one coolant stream outlet, and means for flowing a coolant stream from said at least one coolant stream inlet to said at least one coolant stream outlet, said flowing means maintaining said coolant stream within a single coolant flow field plate;
   wherein said flowing means directs said coolant stream such that the coolest region of said cooling layer substantially coincides with the region of said cathode layer in which the oxidant stream has the highest concentration of oxygen, and the warmest region of said cooling layer substantially coincides with the region of said cathode layer in which the oxidant stream has the lowest concentration of oxygen.

31. The electrochemical fuel cell stack of claim 30 wherein said electrolyte is an ion exchange membrane.

32. An electrochemical fuel cell stack comprising at least one fuel cell assembly, said assembly comprising:
A. at least one fuel cell comprising:
  1. a first electrode layer comprising at least one first reactant stream inlet and means for flowing within said first electrode layer a first reactant stream introduced at said at least one first reactant stream inlet;
  2. a second electrode layer comprising at least one second reactant stream inlet, at least one second reactant stream outlet, and means for flowing a second reactant stream from said at least one second reactant stream inlet to said at least one second reactant stream outlet, said second reactant stream comprising water formed by the electrochemical reaction of said first reactant and said second reactant;
  3. an electrolyte interposed between said first electrode layer and said second electrode layer; and
B. a cooling layer disposed adjacent said second electrode layer, said cooling layer comprising at least one coolant stream inlet, at least one coolant stream outlet, and means for flowing a coolant stream from said at least one coolant stream inlet to said at least one coolant stream outlet, said flowing means maintaining said coolant stream within a single coolant flow field plate;
wherein said flowing means directs said coolant stream such that the coolest region of said cooling layer substantially coincides with the region of said second reactant layer in which the second reactant stream has the lowest water content, and the warmest region of said cooling layer substantially coincides with the region of said second electrode layer in which the second reactant stream has the highest water content.

33. The electrochemical fuel cell stack of claim 32 wherein said electrolyte is an ion exchange membrane.

34. The electrochemical fuel cell stack of claim 32 wherein said first electrode layer is a cathode layer, said first reactant stream is an oxidant stream comprising oxygen, said second electrode layer is an anode layer, and said second reactant stream is a fuel stream comprising hydrogen.

35. A method of controlling the water content of a reactant stream in an electrode layer of an electrochemical fuel cell assembly, said assembly further comprising a cooling layer comprising a coolant stream inlet, a coolant stream outlet, and means for flowing a coolant stream from said at least one coolant stream inlet to said at least one coolant stream outlet, said flowing means maintaining said coolant stream within a single coolant flow field plate, the method comprising:

flowing a coolant stream adjacent said electrode layer such that the coolest region of said cooling layer substantially coincides with the region of said electrode layer in which the reactant stream has the lowest water content and the warmest region of said cooling layer substantially coincides with the region of said electrode layer in which the reactant stream has the highest water content.

36. The method of claim 35 further comprising:
controlling the mass flow rate of said adjacent coolant stream such that a temperature gradient is induced in said coolant stream between said coolant stream inlet and said coolant stream outlet.

37. A method of controlling the water content of the oxidant stream in a cathode layer of an electrochemical fuel cell assembly, said oxidant stream comprising oxygen, said assembly further comprising a cooling layer comprising a coolant stream inlet, a coolant stream outlet, and means for flowing a coolant stream from said at least one coolant stream inlet to said at least one coolant stream outlet, said flowing means maintaining said coolant stream within a single coolant flow field plate, the method comprising:

flowing a coolant stream adjacent said electrode layer such that the coolest region of said cooling layer substantially coincides with the region of said electrode layer in which the oxidant stream has the highest concentration of oxygen and the warmest region of said cooling layer substantially coincides with the region of said electrode layer in which the oxidant stream has the lowest concentration of oxygen.

38. The method of claim 37 further comprising:
controlling the mass flow rate of said adjacent coolant stream such that a temperature gradient is induced in said coolant stream between said coolant stream inlet and said coolant stream outlet.

* * * * *